United States Patent [19]

Chan

[11] Patent Number: 4,666,276
[45] Date of Patent: May 19, 1987

[54] HOT SHOE ATTACHMENTS

[75] Inventor: Jimmy Chan, Kowloon, Hong Kong

[73] Assignee: Achiever Industries Limited, Kowloon, Hong Kong

[21] Appl. No.: 774,325

[22] Filed: Sep. 10, 1985

[30] Foreign Application Priority Data

Feb. 6, 1985 [GB] United Kingdom ............... 8502973

[51] Int. Cl.⁴ ............................................. G03B 15/05
[52] U.S. Cl. ...................................... 354/145.1; 362/3
[58] Field of Search ................... 354/145.1, 126; 362/3

[56] References Cited

U.S. PATENT DOCUMENTS

| 4,249,813 | 2/1981 | Nihei | 354/145.1 |
| 4,256,393 | 3/1981 | Dietrich et al. | 354/145.1 |
| 4,555,747 | 11/1985 | Tsuruta | 354/145.1 |

Primary Examiner—A. A. Mathews
Attorney, Agent, or Firm—Warren B. Kice

[57] ABSTRACT

An hot shoe attachment for fitting a flash gun or the like to the hot shoe of a camera has a flanged body for fitting to the hot shoe with a locking ring screw threaded thereto for clamping it in place. Electrical contact means on the body on the attachment are resiliently urged towards and against the hot shoe when the attachment is fitted. As the locking ring is unscrewed to release the attachment, the contact means are simultaneously withdrawn from the hot shoe to avoid damage by contact therewith as the flash gun or the like is removed. Only when the locking ring is again screwed to its clamping position do the contact means again project from the body. The contact means are normally mounted in a bushing which itself has flanges engaged by the locking ring at least as the locking ring is unscrewed. Resilient urging means may be applied to the contact means, the bushing or both.

11 Claims, 3 Drawing Figures

HOT SHOE ATTACHMENTS

BACKGROUND OF THE INVENTION

This invention relates to attachment of flash units and the like to cameras and in particular the invention relates to a hot shoe attachment for fitting items such as a flash gun to the hot shoe of a camera body.

Cameras which do not have an integral flash unit usually have what is known as a hot shoe on the camera body and a flash unit is attached to the camera by means of a corresponding hot shoe attachment. The hot shoe has one or more electrical contacts which connect with corresponding electrical contacts on the flash unit so that operation of the camera can also control the flash unit. The hot shoe generally comprises a form of bracket which is engaged by a corresponding attachment on the flash unit and a screw locking ring is usually provided for temporarily clamping the flash unit to the camera.

To provide good electrical contact the hot shoe attachment on the flash unit generally has a number of pointed, projecting, spring-loaded contacts. These are however liable to mark and damage the surface of the hot shoe on the camera when the attachment on the flash unit as it slides into or out of the bracket on the camera. It is therefore an object of the invention to elminate this marking and potential damage.

SUMMARY OF THE INVENTION

The present invention is an hot shoe attachment for fitting a flash gun or the like to the hot shoe of a camera. The attachment has contact means for engagement with corresponding contact means on the camera; spring means resiliently biasing contact means to a position at which it projects from the attachment for such engagement; a locking screw ring for clamping the attachment to the camera, which screw ring is rotatable between an open position enabling the attachment to be mounted on or removed from the hot shoe of the camera, and a closed position for locking the attachment to said hot shoe; and means coupled to rotation of the screw ring for retracting the contact means against the force of said spring means as the ring is moved from its closed to its open position.

In a preferred feature, the contact means is mounted in a bushing slideably mounted in the attachment, the position of the bushing relative to the attachment being determined by the position of the screw ring. The bushing will normally be continuously urged in one sense of its available direction of movement such that the locking ring has only to apply a force in the other sense to accurately locate its position. This one sense is normally the same as that in the contact means is urged, the same biasing means serving both functions, but the contact means may be independently liased with the bushing, and the bushing continuously urged by some other mechanism.

The arrangement according to the invention has the advantage that the spring-loaded contacts can be withdrawn or retracted during the time the attachment is being fitted to the camera and so these projecting contacts will then not scratch or otherwise harm the surface of the hot shoe which has its own electrical contact regions. Additionally there is the advantage that the retraction of the contacts is automatic, in the sense that the locking screw ring will need to be unlocked during the attachment or detachment of the flash gun and at those times the contacts will automatically be retracted. However, once the flash unit is in place and the screw ring rotated to lock the flash unit to the hot shoe, then the electrical contacts will be released and will function normally and press against corresponding contact regions on the camera and so give good electrical contact.

In one preferred embodiment of the invention the contact or contacts of the flash unit are resiliently mounted within a bushing which itself has one or more projecting flanges engaged by the screw ring or locking ring. The contacts have a seating position in the bushing and when the screw ring is in its locking position the contacts resiliently urge the bushing to one limit position where the resilient contacts project from the base of the flash gun. However, as the locking ring is moved to its open position, the bushing is retracted upwardly as well and the resilient contacts are themselves drawn upwardly to a non-projecting position by their engagement with their respective seats in the bushing.

BRIEF DESCRIPTION OF THE DRAWINGS

Various features and advantages of the invention will be apparent from the following description of a preferred embodiment thereof in which reference will be made to the accompanying drawing. It will be understood that many of these features may be adopted alone or in combination with others referred to herein. In the drawings.

DESCRIPTION OF THE PREFERRED EMBODIMENT

Figure 1:
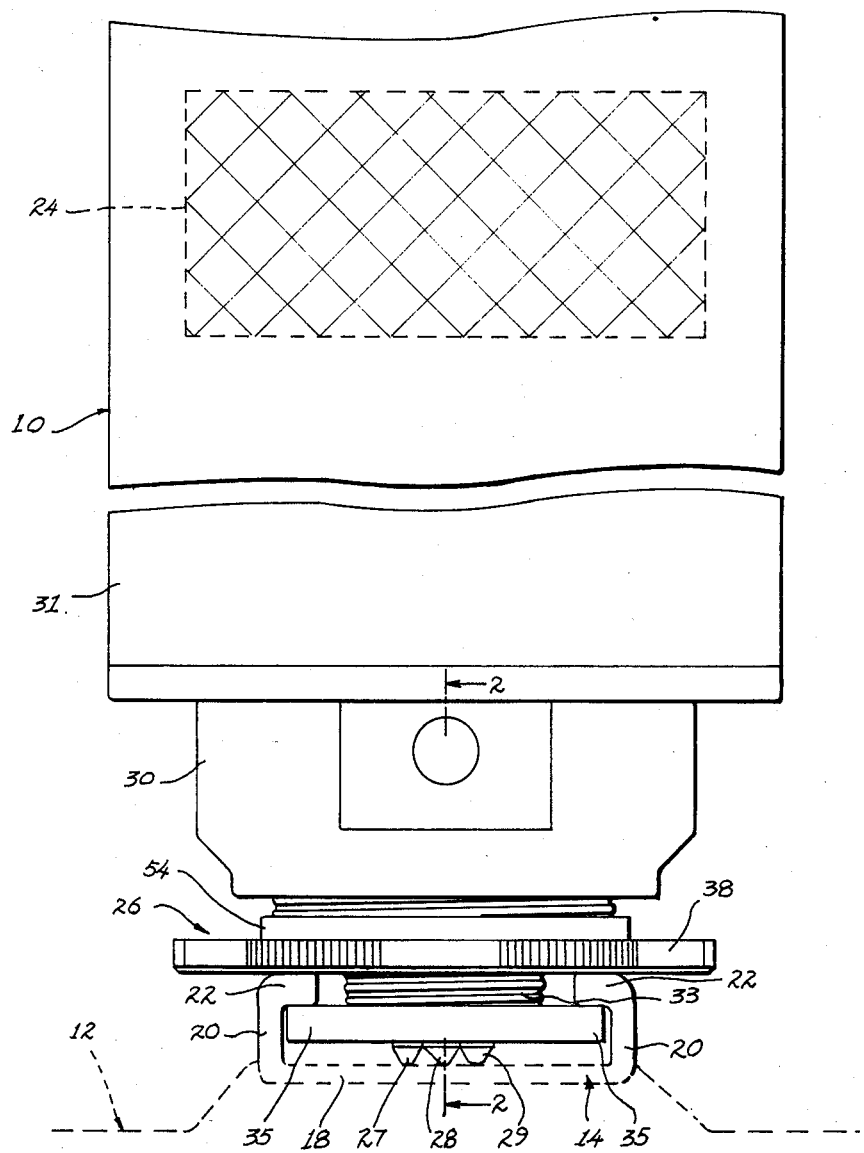
FIG. 1 is a rear view of the hot shoe attachment showing it attached to a camera shown in broken lines, the flash gun being shown only in outline.

Referring first of all to FIG. 1 a flash unit is shown attached to the top of camera 12 with the camera being shown in broken lines. On the top surface of the camera is a conventional hot shoe 14, also shown in broken lines. This basically comprises a metal bracket 16 having a base 18, upstanding sides 20 and inwardly projecting ends 22. The hot shoe also has an upstanding front which is not shown in FIG. 1 to define the extent to which the attachment on the flash unit can be inserted into it. Also, not shown, since this is entirely conventional, are electrical contact regions defined in the base of the hot shoe.

The flash unit 10 is, apart from its attachment 26, entirely conventional and it is not believed that extensive further description is necessary. The flash unit includes a flash light 24, not shown in detail, whilst at the lower end of the flash unit there is an attachment 26 designed to fit the hot shoe 14 of the camera. The attachment has electrical contacts 27, 28 and 29 which contact the electrical contact regions defined in the base of the hot shoe. The contacts 27 to 29 are in turn linked to a conventional operating mechanism (not shown) in the unit 10 to cause the flash discharge synchronously with the operation of the camera.

The attachment 26 includes a hollow housing 30 joined to a main body 31 of the flash unit. Depending from the lower end of the housing 30 is a hollow cylindrical base 32. Its outer face has a screwthread 33. At its lower end the base is closed by a squared end 34 which includes sidewardly projecting flanges 35 and a forwardly projecting flange 36. The sideward projecting flanges 34 are of a size to fit snugly within the hot shoe 14 so that the inwardly projecting ends 22 trap the flanges 35 to hold the flash unit in place.

Figure 2:
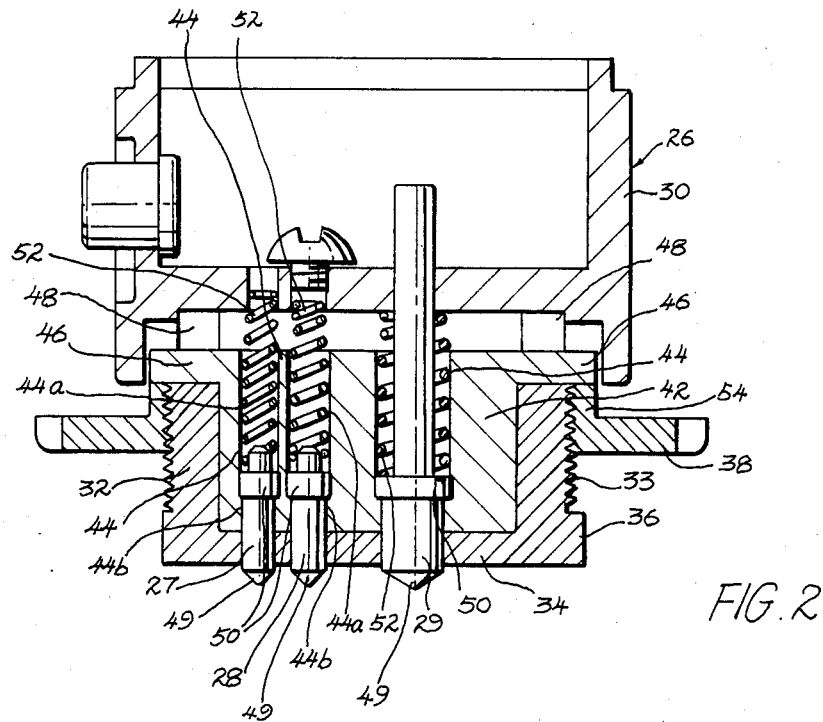
FIG. 2 is a detailed section taken on the line 2—2 showing the contacts in their standard position.

Rotatably mounted around and engaging the screwthread 33 is a locking ring 38. This can be screwed to a lower position as shown in FIGS. 1 and 2 where eventually it will abut the top edge of the inwardly projecting ends 22 on the bracket and so lock the flash unit securely in place by trapping those ends between itself and the squared outwardly projecting flanges 35. When the flash unit is to be fitted or removed from the camera, however, the locking ring 38 is rotated to an upper position shown in FIG. 3. Here it no longer physically traps the inwardly projecting ends 22 and so the flash unit can readily slide into or out of the hot shoe 14.

As noted above, the flash unit has a number of resiliently mounted electrical contacts 27, 28 and 29. In the specific embodiment shown, three contacts can be seen but this is not critical and the number of contacts and their positioning is chosen so as to correspond with the positioning of the contact regions in the hot shoe of the camera and it is well known that different makes and models of cameras require differing positions and numbers of such contacts.

Figure 3:
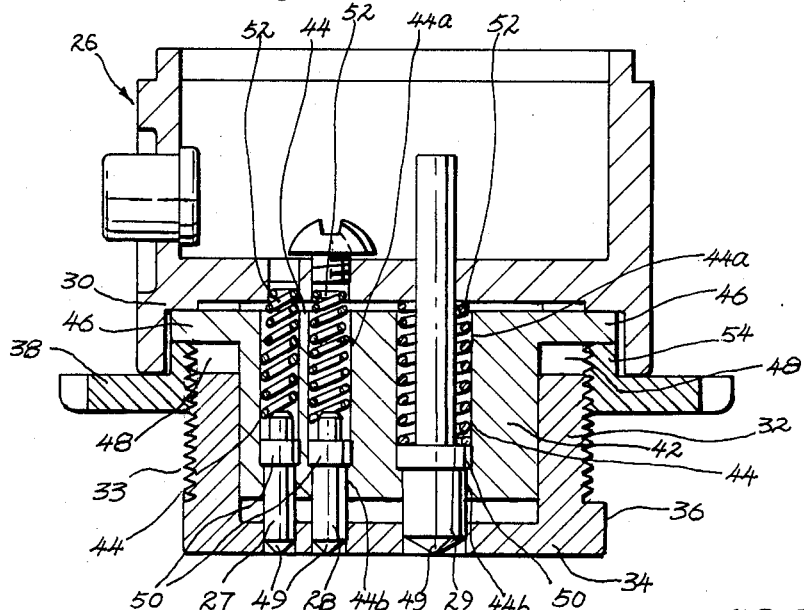
FIG. 3 is a section similar to FIG. 2 showing the contacts retracted.

As best shown in FIGS. 2 and 3, a bushing 42 is slidably positioned within the base 32. This bushing has cylindrical bores 44 through it corresponding to the positions of the electrical contacts 27 to 29 which themselves extend through those bores. The bushing also has at its upper end outwardly projecting lugs 46 which slidably engage and extend through slots 48 in the base 32.

Each contact has a pointed end contact portion 49 which resiliently projects through the end 34 of the base 32 and an enlarged diameter seating flange 50. Each bore 44 has an enlarged diameter region 44a at its upper end within which the respective enlarged seating flanges 50 can slide and a reduced diameter region 44b at its lower end against the end of which the respective seating flanges will abut. Within the enlarged diameter region 44a of the bores 44 are provided coiled springs 52 which bear against the flanges 50 to bias the contacts resiliently towards their projecting position.

This projecting position is shown in FIGS. 1 and 2. The springs 52 urge the contacts 27 to 29 downwardly and when they engage a corresponding contact region in the hot shoe of the camera, they will normally not extend quite as far as in FIG. 2 so that they will be freely and resiliently urged by the springs 52 into good electrical contact.

It will be noted that the springs 52 simultaneously urge both the contacts 27 to 29 and the bushing 42 downwards as shown. Separate springs may be provided if desired; particularly, the contacts may be biased only with respect to the bushing, and movement of the bushing controlled independently. Some biasing of the bushing is though desirable, in one or other sense of its direction of movement.

The locking ring 38 has a central integral upstanding cylindrical portion 54 to engage the lugs 46. As the locking ring 38 is screwed upwardly, these lugs 46 are engaged by the top of the cylindrical portion 54 on the locking ring with the result that the bushing 42 is moved to an upward position shown in FIG. 3. In so doing the end of the reduced diameter portion 44b of each bore will contact the respective seating flanges 50 on the electrical contacts and as the bushing is moved progressively to the upper position shown in FIG. 3 the electrical contacts 27 to 29 will be withdrawn to a retracted position where their end portions no longer project from the end 34 of the base 32. This has the advantage of ensuring that the contacts are not pressed by their springs against the contact regions of the hot shoe of the camera whilst the flash unit is being withdrawn from or attached to the hot shoe and this avoids damage and marking of the delicate contact areas in the hot shoe.

A further advantage of the invention is that the retraction of the contacts 27 to 29 occurs automatically as the locking ring 38 is actuated to unlock the flash unit from the hot shoe.

I claim:

1. An hot shoe attachment for fitting a flash gun to the hot shoe of a camera, the attachment having contact means for engagement with corresponding contact means on the camera; spring means resiliently biasing contact means to a position at which it projects from the attachment for such engagement; a locking screw ring for clamping the attachment to the camera, which screw ring is rotatable between an open position enabling the attachment to be mounted on or removed from the hot shoe of the camera, and a closed position for locking the attachment to said hot shoe; and means coupled to rotation of the screw ring for retracting the contact means against the force of said spring means as the ring is moved from its closed to its open position.

2. An hot shoe attachment according to claim 1 wherein the contact means is mounted in a bushing slideably mounted in the attachment, the position of the bushing relative to the attachment being determined by the position of the screw ring.

3. An hot shoe attachment according to claim 2 wherein said spring means resiliently biases the bushing to a station at which the contact means projects from the attachment for said engagement, rotation of the screw ring to its open position retracting the bushing from said station.

4. An hot shoe attachment according to claim 2 or claim 3 wherein the contact means comprises elongate contacts projecting through openings in the base of the bushing, the base being formed with a seat at the end of each bushing defining the extent to which each contact can project through its respective opening, the spring means continuously urging each contact toward its seat.

5. An hot shoe attachment for fitting a flash gun to the hot shoe of a camera, the attachment including a body defining a mounting axis and housing flanges extending laterally therefrom for coupling to the hot shoe of a camera; a bushing slideably received in the body for axial movement relative thereto; contact means mounted on the bushing with resilient means continuously urging the contact means to project from the bushing for engagement with corresponding contact means on the hot shoe of a camera; and a locking ring in screw-threaded engagement with the body and rotatable between an open position at which the bushing and contact means are relatively withdrawn into the body enabling the attachment to be mounted on or removed from the camera, and a closed position for locking the attachment to the camera at which the bushing is extended relative the body with the contact means projecting therefrom for said engagement.

6. An hot shoe attachment according to claim 5 including means continuously biasing the bushing in an axial direction.

7. An hot shoe attachment according to claim 5 wherein the resilient means continuously urge the contact means axially relative the body, toward stop means on the bushing, whereby said resilient means also continuously urge the bushing in the same axial direction.

8. An hot shoe attachment according to claim 5, claim 6 or claim 7 wherein the bushing is formed with lugs engaged by the locking ring to effect movement of the bushing in response to rotation of the locking ring.

9. A flash gun for mounting on the hot shoe of a camera and including an attachment housing contact means for engagement with corresponding contact means on the camera; spring means resiliently biasing contact means to a position at which it projects from the attachment for such engagement; a locking screw ring for clamping the attachment to the camera, which screw ring is rotatable between an open position enabling the attachment to be mounted on or removed from the hot shoe of the camera, and a closed position for locking the attachment to said hot shoe; and means coupled to rotation of the screw ring for retracting the contact means against the force of said spring means as the ring is moved from its closed to its open position.

10. A flash gun according to claim 9 wherein the attachment includes a bushing mounted for linear movement therewithin which bushing carries the contact means, means continuously urging the bushing in one direction of its movement, the screw being rotatable to define the position of the bushing within its range of movement.

11. A flash gun for mounting on the hot shoe of a camera and including an attachment comprising a body defining a mounting axis and housing flanges extending laterally therefrom for coupling to the hot shoe of a camera; a bushing slideably received in the body for axial movement relative thereto; contact means mounted on the bushing with resilient means continuously urging the contact means to project from the bushing for engagement with corresponding contact means on the hot shoe of a camera; and a locking ring in screw-threaded engagement with the body and rotatable between an open position at which the bushing and contact means are relatively withdrawn into the body enabling the attachment to be mounted on or removed from the camera, and a closed position for locking the attachment to the camera at which the bushing is extended relative the body with the contact means projecting therefrom for said engagement.

* * * * *